United States Patent
Elliott, IV

(10) Patent No.: US 9,323,789 B1
(45) Date of Patent: Apr. 26, 2016

(54) AUTOMATED APPLICATION PROTECTION AND REUSE USING A WORKFLOW COMPONENT

(75) Inventor: William J. Elliott, IV, Holden, MA (US)

(73) Assignee: EMC Corporation, Hopkinton, MA (US)

(*) Notice: Subject to any disclaimer, the term of this patent is extended or adjusted under 35 U.S.C. 154(b) by 578 days.

(21) Appl. No.: 13/419,651

(22) Filed: Mar. 14, 2012

(51) Int. Cl.
*G06F 7/00* (2006.01)
*G06F 17/00* (2006.01)
*G06F 17/30* (2006.01)

(52) U.S. Cl.
CPC .... *G06F 17/30286* (2013.01); *G06F 17/30575* (2013.01)

(58) Field of Classification Search
None
See application file for complete search history.

(56) References Cited

U.S. PATENT DOCUMENTS

| | | | |
|---|---|---|---|
| 6,018,741 A * | 1/2000 | Howland et al. | 707/696 |
| 7,386,556 B2 * | 6/2008 | Buskens et al. | |
| 2009/0171732 A1 * | 7/2009 | Bobak et al. | 705/8 |
| 2009/0172682 A1 * | 7/2009 | Bobak et al. | 718/103 |
| 2009/0172689 A1 * | 7/2009 | Bobak et al. | 718/104 |
| 2011/0078426 A1 * | 3/2011 | Stoitsev | 712/244 |

* cited by examiner

*Primary Examiner* — Robert Beausoliel, Jr.
*Assistant Examiner* — Michael Pham
(74) *Attorney, Agent, or Firm* — Daly, Crowley, Mofford & Durkee, LLP

(57) ABSTRACT

In one aspect, a method includes validating application components, a set of operations and a flow of the operations. The application components, the operations and the flow of the operations are determined from a service plan. The flow of the operations enables protection and reuse of application components. The method also includes executing an operation of the set of operations, collecting status of the executing of the operation, determining dependent operations that are dependent on the operation, performing an affinity process based on a set of rules to determine which application components to group under a single dependent operation and which application components to separate into different dependent operations, and repeating the validating, executing, collecting, and determining for each dependent operation.

20 Claims, 17 Drawing Sheets

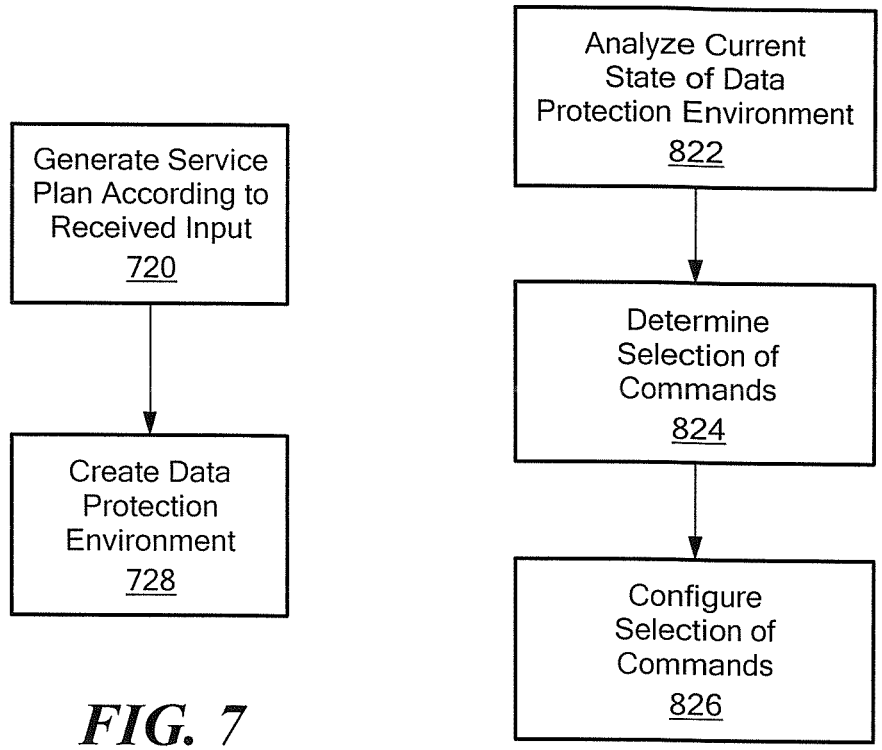
*FIG. 7*
*FIG. 8*
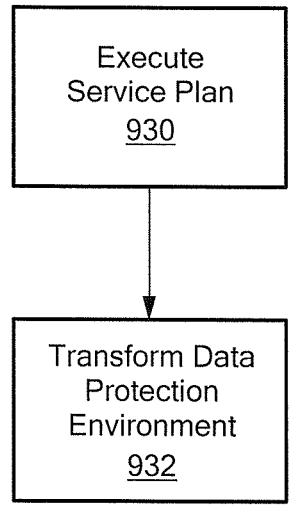
*FIG. 9*

AUTOMATED APPLICATION PROTECTION AND REUSE USING A WORKFLOW COMPONENT

BACKGROUND

Data protection (e.g., replication) may be provided by a data protection process that makes a copy of an original set of data at target devices. The copy of the data may be used if an event such as data failure occurs such as, for example, when the original copy of data is destroyed, corrupted, or otherwise unavailable. Different strategies may be used to provide data protection for different types of failures that can occur. A data protection policy (DPP) may be generated to meet data protection criteria or objectives determined in a variety of different ways. Such criteria may be specified in a service level agreement (SLA), by management or administrators, and the like. Once generated, the data protection policy may then be implemented.

SUMMARY

In one aspect, a method includes validating application components, a set of operations and a flow of the operations. The application components, the operations and the flow of the operations are determined from a service plan. The flow of the operations enables protection and reuse of application components. The method also includes executing an operation of the set of operations, collecting status of the executing of the operation, determining dependent operations that are dependent on the operation, performing an affinity process based on a set of rules to determine which application components to group under a single dependent operation and which application components to separate into different dependent operations, and repeating the validating, executing, collecting, and determining for each dependent operation.

In another aspect, an apparatus includes a non-transitory machine-readable medium that stores executable instructions. The instructions cause a machine to validate application components, a set of operations and a flow of the operations. The application components, the operations and the flow of the operations are determined from a service plan. The flow of the operations enables protection and reuse of application components. The instructions also cause a machine to execute an operation of the set of operations, collect status of the executing of the operation, determine dependent operations that are dependent on the operation, perform an affinity process based on a set of rules to determine which application components to group under a single dependent operation and which application components to separate into different dependent operations, and repeat the validating, executing, collecting, and determining for each dependent operation.

In a further aspect, an apparatus includes circuitry configured to validate application components, a set of operations and a flow of the operations. The application components, the operations and the flow of the operations are determined from a service plan. The flow of the operations enables protection and reuse of application components. The circuitry is also configured to execute an operation of the set of operations, collect status of the executing of the operation, determine dependent operations that are dependent on the operation, perforin an affinity process based on a set of rules to determine which application components to group under a single dependent operation and which application components to separate into different dependent operations, and repeat the validating, executing, collecting, and determining for each dependent operation.

BRIEF DESCRIPTION OF THE DRAWINGS

FIG. 7 is a flow diagram of an example of a process to generate a data protection environment.

FIG. 8 is a flow diagram of an example of a process to generate a service plan according to received input regarding a desired state of the data protection environment.

FIG. 9 is a flow diagram of an example of a process to generate a data protection environment.

DETAILED DESCRIPTION

Figure 1:
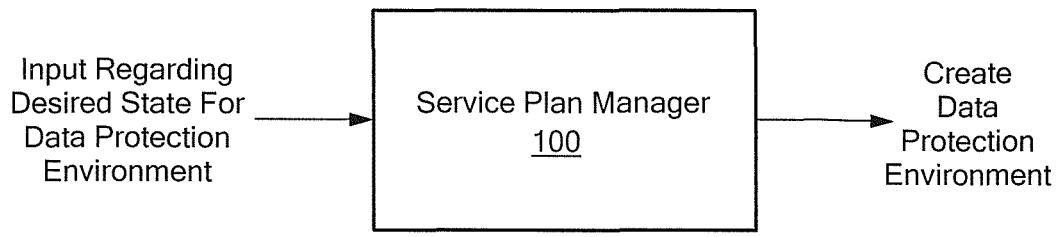
FIG. 1 is a simplified block diagram of an example of a service plan manager.

Described herein are techniques to provide configuration of a system to provide application protection and reuse without requiring a user to specify the details of such a configuration. Rather, the user defines their operational and service requirements and the techniques described herein configure the system to meet the user's operational and service requirements.

As used herein application protection involves copying an application. Reuse involves taking the copy of the application and performing other functionality while not affecting production data. For example, a mail database may be copied and the copy may be used for further analysis but the original database is unaffected.

IT organizations are challenged with maintaining data application and availability while satisfying service level agreements and compliance requirements. Unprecedented data growth is straining IT resources requiring greater investments, while capital and operational expenses are under scrutiny. Given this tension, IT organizations are seeking efficiency and optimization to regain control and meet business SLAs.

The combination of server consolidation through virtualization and increasing use of pool-based storage has changed the paradigm for storage management. Applications are less often tied to individual disk spindles, and instead there are several layers of abstraction in the mapping to applications to disk. These layers of abstraction give storage administrators more flexibility to manage capacity and balance workloads, but at a price of increased complexity. It is no longer good enough to use replication of disk spindles as a proxy for protecting application. IT needs to manage application service levels via a top-down approach that starts with application awareness, and needs the system to manage the mapping to storage.

This change in the storage management paradigm calls for increased levels of automation in the management of distributed replication processes. This increased level of workflow and management automation requires policy (e.g., service plan) creation, monitoring and enforcement, and support for application level integration. Unified Replication Management (URM) is about improved levels of replication management through policy controls and automation of protection tasks of customers' applications. These functions are typically found in traditional backup application and are moving to the replication.

Example embodiments of the present invention enable the automation of application level policy management and configuration of data protection and disaster recovery. At its core, is a policy engine enabling a common user interface (UI) that works across various replications technologies to provide policy configuration, resource 5 pool creation, analytics and automated execution of configured protection and disaster recovery policies. Example embodiments of the present invention address the following:

Manual Process Automation: Example embodiments of the present invention free administrators from manually (or scripting) tracking, monitoring, scheduling and ensuring that application recoverability service levels are being met for thousands of LUNS and volumes across hundreds of systems by automating these tasks.

Recovery Risk Management: Example embodiments of the present invention manage existing protection policies by automatically discovering unprotected data and applying a protection policy to mitigate risk.

Increased Visibility: IT environments include many systems, applications, people, tools, and backup technologies. Example embodiments of the present invention consolidate these views into a single framework, a comprehensive view of the data protection environment. The UI maps applications, hosts to volumes and detects existing relationships.

Simplification: Example embodiments of the present invention provide a UI that masks the complexity of configuring and managing underlying tasks such as snapshot creation, provisioning, and data movement. Example embodiments of the present invention enable the server, application and storage administrators to think about protecting their environment without the burden of storage level tasks.

Compliance metrics: Traditional protection processes are error prone requiring the need for recovery testing. URM provides a centralized, policy driven management environment for distributed, heterogeneous replicas and monitoring, tracking, and analysis of protection vulnerabilities. Example embodiments of the present invention ensure the customer is in compliance of business rules and will identify protection gaps.

Management of business requirements: Customers manage replication of applications and its infrastructure based on their business needs defined by Service Level Agreements (SLAs). Example embodiments of the present invention automate workflows to achieve SLAs, and identify SLAs failures so the administrators can take corrective actions.

Figure 4:
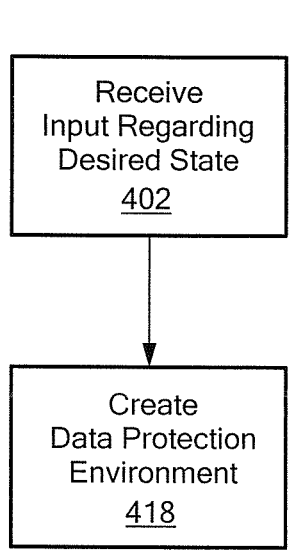
FIG. 4 is a flow diagram of an example of a process to performing automated data protection.

FIG. 1 is a simplified block diagram illustrating a service plan manager 100 according to an example embodiment of the present invention. FIG. 1 may be studied in combination with the flow diagram of FIG. 4 illustrating an example method for performing automated data protection according to received input regarding a desired state of the data protection environment according to an example embodiment of the present invention. As illustrated in FIGS. 1 and 4, and will be described in greater detail below, the service plan manager 100 may receive input regarding a desired state of a data protection environment for an information technology (IT) infrastructure (e.g., managed entities 260) (402) and create a data protection environment according to the desired state of the data protection environment (418).

Figure 2:
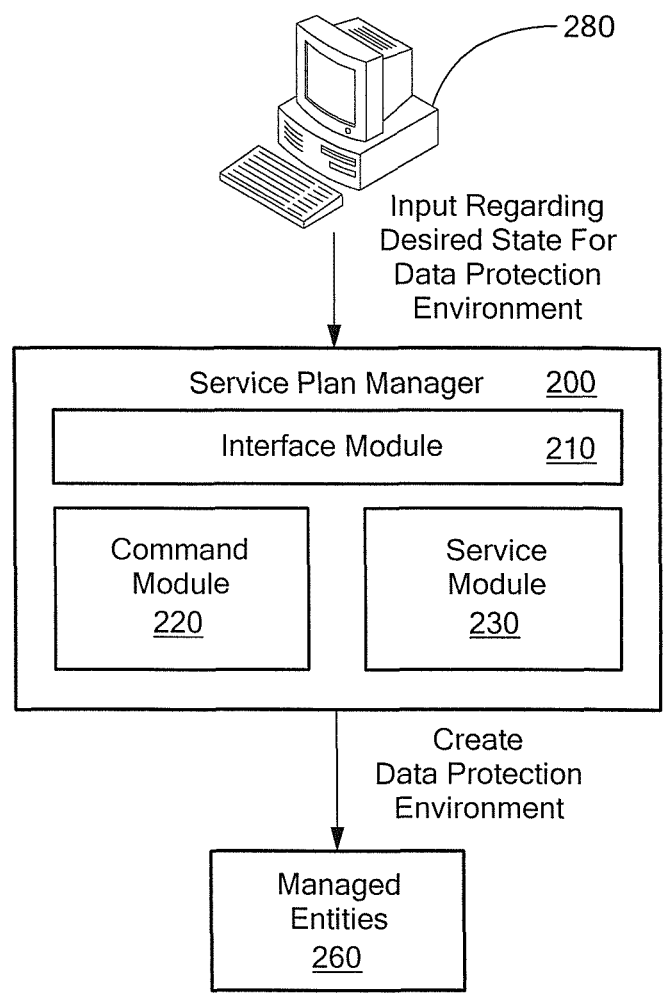
FIG. 2 is a simplified block diagram of another example of a service plan manager.

FIG. 2 is a simplified block diagram illustrating a service plan manager 200, including an interface module 210, a command module 220, and a service module 230, according to an example embodiment of the present invention. The interface module 210 may be configured to receive input regarding a desired state for a data protection environment, such as via a user interface 280. It should be understood that the interface module 210 also may receive input regarding a desired state for a data protection environment internally, such as following an analysis of the data protection environment, as will be described below in greater detail with reference to FIGS. 10 to 12. Moreover, as will be described below in greater detail, the command module 220 and the service module 230, in combination, may create the data protection environment.

In certain embodiments, the command module 220 may issue synchronous commands in which the command module 220 calls a method provided by the service module 230 and waits until the service is complete. In other embodiments, the command module 220 may issue asynchronous commands in which the command module 220 provides a queue for the service module 230, calls methods provided by the service module 230 and returns. The service module picks up commands from the queue, satisfies them, and publishes a response to the command to the queue.

Figure 3:
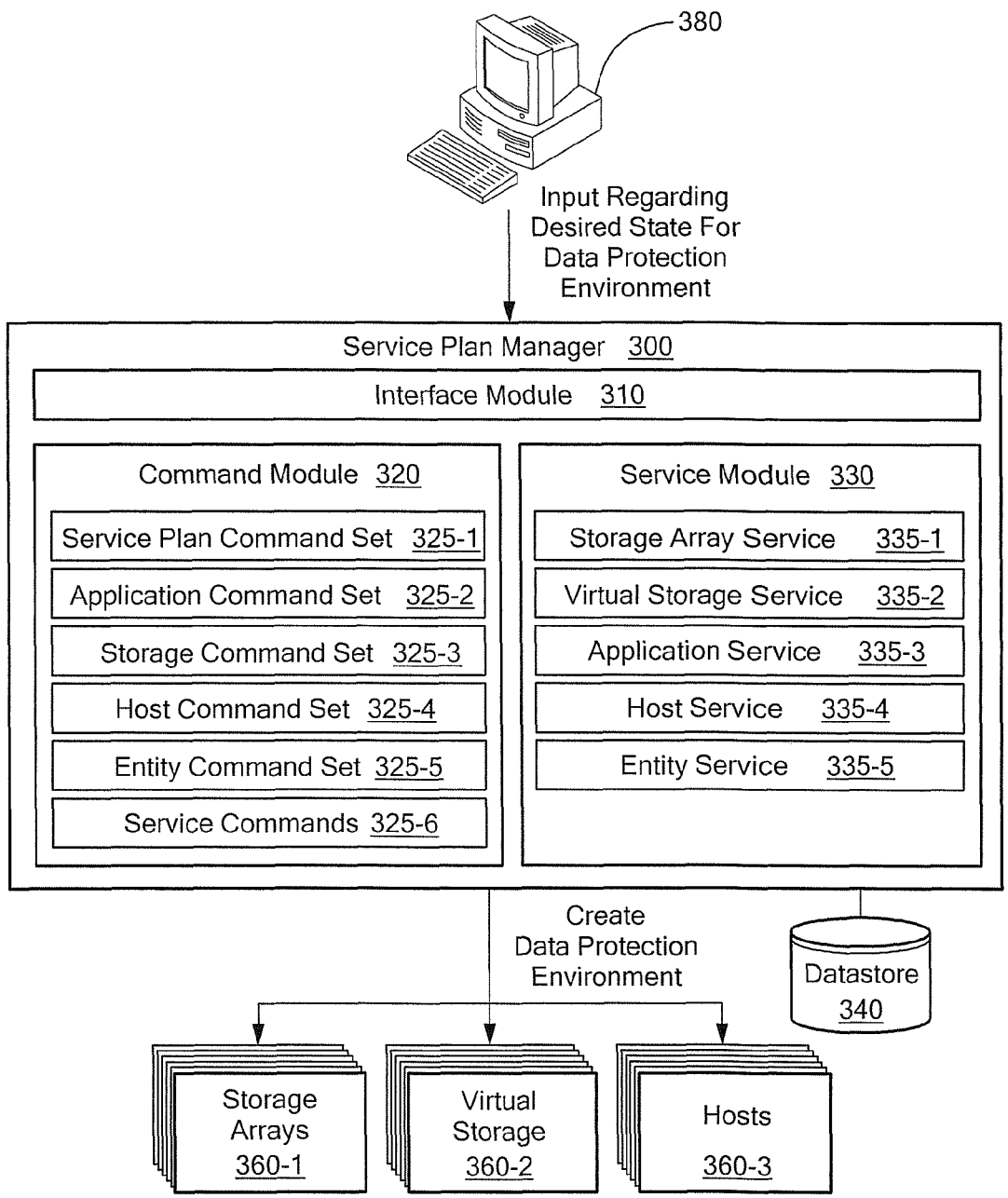
FIG. 3 is a block diagram of a further example of a service plan manager.

FIG. 3 is a block diagram of an example of a service plan manager 300. As illustrated in FIG. 3, the service plan manager 300 includes an interface module 310, a command module 320, and a service module 330. As described above with reference to FIG. 2, the interface module 310 may be configured to receive input regarding a desired state for a data protection environment, such as via a user interface 380. It should be understood that the interface module 310 also may receive input regarding a desired state for a data protection environment internally, such as following an analysis of the data protection environment, as will be described below in greater detail with reference to FIGS. 10-12.

The command module 320 may include a plurality of command sets (e.g., service plan command set 325-1, application command set 325-2, storage command set 325-3, host command set 325-4 entity command set 325-5) (325, generally). Command sets either sit on top of services to provide a more convenient interface to the service or knit services together to provide the business logic required to perform heterogeneous operations.

Service plan command set 325-1: The service plan commands tie all of the other commands together to perform long running activities like creating protection sets of applications, mounting replicas and restoring. It acts on any combination of applications and storage types. A particular example of a service command set 325-1 is described starting with FIG. 14.

Application command set 325-2: Application commands contain the business logic required to do various application operations. For example, in order to provide protection for an application, example embodiments of the present invention need to translate application objects in to file system objects that can then be replicated for protection. Each application command set knows how to do this translation for its application. Likewise, application commands know how to recover the application after a host based restore is completed to restore an application from a previously created protection set Storage command set 325-3: The storage command set performs storage related operations. Commands to create array based snapshots or bookmarks reside here. Storage commands are also responsible for doing LUN based restore operations.

Host Command set 325-4: The Host command set is responsible for performing operations related to hosts and file systems residing on hosts. For example, the host commands would be able to translate a file system in to the LUN it resides on. Host commands would also be responsible for doing any host related operation after a restore, such as surfacing LUNs and assigning drive letters.

Entity command set 325-5: The entity command provides database queries for the datastore 340. It is broken down by entity type. Common methods exist for each entity such as getting the entity by a universally unique identifier (UUID), getting the entity by name and getting a list of all entities of a particular type. Each entity type may also have entity commands that perform specific queries related to only that type.

Service commands 325-6: Service commands provide an interface to external modules that example embodiments of the present invention use to perform operations on storage arrays or production hosts. These external modules may run as separate processes on remote hosts or may be run on the same host hosting example embodiments of the present invention.

The service module 330 may include a plurality of services (e.g., storage array service 335-1, virtual storage service 335-2, application service 335-3, host service 335-4 and entity service 335-5) (335, generally) for creating a data protection environment. Services perform simple operations related to external modules such as hosts, storage arrays and application providers. In certain embodiments, each service is self-contained and does not know about other services or the commands. In other embodiments services contain no business logic.

Storage array service 335-1 and virtual storage service 335-2: Services that do storage array operations (one per support storage platform).

Application service 335-3: Services that perform application specific operations (one per supported application)

Host service 335-4: Services that perform host services.

Entity service 335-5: Services that perform database operations for the datastore 340.

Accordingly, as will be described below in greater detail, with policy specifications and the analysis logic in place, the service plan manager 300 can intelligently modify physical and scheduling resources to bring policy violations back into compliance automatically.

Service plans generated by the service plan manager 300 may be stored to a datastore 340. This allows the best practices for managing a given application type to be shipped with example embodiments of the present invention, thereby reducing the amount of user intervention needed to start a series of protection or repurposing steps. Further, customers that need more complex protocols can start with built-in service plans and customize them for their own needs or reuse them as templates that can be created and distributed to administrators.

Figure 5:
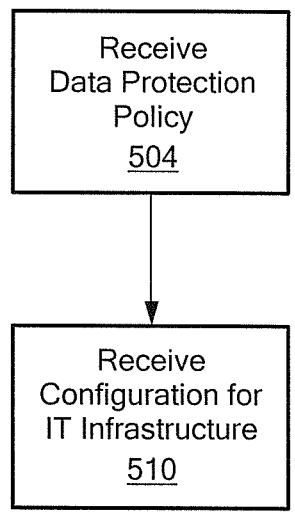
FIG. 5 is a flow diagram of an example of a process to receive input regarding a desired state of a data protection environment.

FIG. 5 is a flow diagram is an example of a process to receive input regarding a desired state of a data protection environment (e.g., 402 of FIG. 4). As illustrated in FIG. 5, the interface module 310 may receive a data protection policy for the IT infrastructure (e.g., arrays 360-1, virtual arrays 360-2, and hosts 360-3 of FIG. 3) (504). The interface module 310 also may receive a configuration for the IT infrastructure (510).

Figure 6:
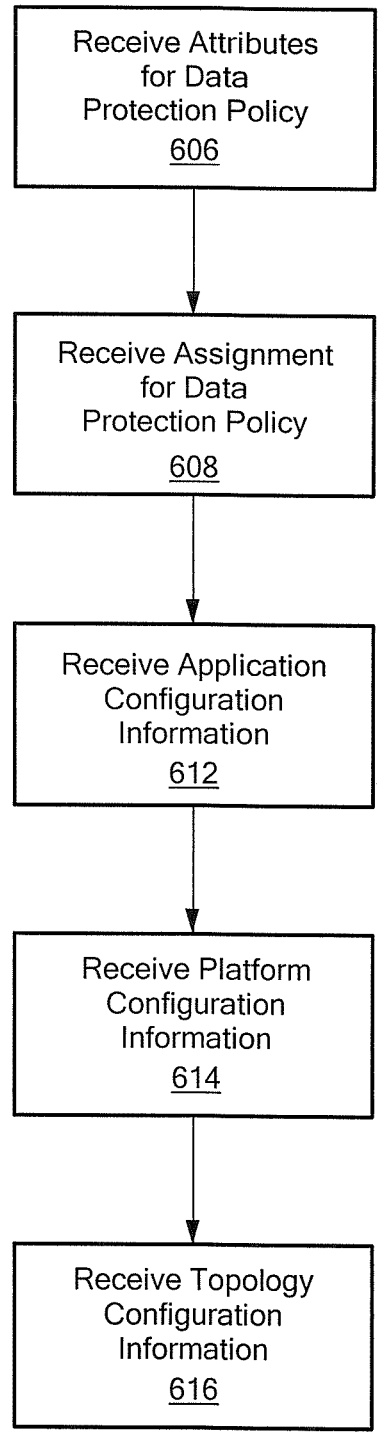
FIG. 6 is a flow diagram of an example of a process to receive data protection policy information and receiving configuration information for an IT infrastructure.

FIG. 6 is a flow diagram is an example of a process to receive data protection policy information and receiving configuration information for an IT infrastructure. As illustrated in FIG. 6, to receive a data protection policy for the IT infrastructure (504), the interface module 310 may receive attributes for the data protection policy for the IT infrastructure (606) and receive an assignment for the data protection policy for the IT infrastructure (608). Further, to receive a configuration for the IT infrastructure (510), the interface module 310 may receive configuration information regarding applications in the IT infrastructure (612), receive configuration information regarding platforms in the IT infrastructure (614), and receive configuration information regarding network topology in the IT infrastructure (616).

FIG. 7 is a flow diagram is an example of a process to generate a data protection environment (e.g., 418 of FIG. 4). As illustrated in FIG. 7, the command module 320 may generate a service plan according to the input regarding the desired data protection environment (720). The service module 330 then may create the data protection environment according to the service plan (728).

FIG. 8 is a flow diagram is an example of a process to generate a service plan according to received input regarding a desired state of the data protection environment. As illustrated in FIG. 8, to generate a service plan according to the input regarding the desired data protection environment (720), the command module 320 may analyze a current state of the data protection environment (822). In certain embodiments, to analyze a current state of the data protection environment (822), the command module 320 may determine whether a current state of the data protection environment conforms to the desired state of the data protection environment.

Further, the command module 320 may determine a selection of commands to transform the data protection environment to the desired state of the data protection environment to conform to the received input (824). For example, the command module 320 may determine the selection of commands from a plurality of commands sets (e.g., 20 service plan command set 325-1, application command set 325-2, storage command set 325-3, host command set 325-4 entity command set 325-5) (325, generally) to transform the current state of the data protection environment to the desired state of the data protection environment to conform to the received input if the current state of the data protection environment does not conform to the desired state of the data protection environment.

In certain embodiments, to determine a selection of commands to transform the data protection environment to the desired state of the data protection environment to conform to the received input (824), the command module 320 may determine a selection of commands to transform the current state of the data protection environment to the desired state of the data protection environment to conform to the received input if the current state of the data protection environment does not conform to the desired state of the data protection environment.

The command module 320 then may configure the selection of commands (826). In certain embodiments, to configure the selection of commands, the command module 320 may configure the selection of commands to transform the data protection environment from the current state of the data protection environment to the desired state of the data protection environment to conform to the received input.

FIG. 9 is a flow diagram is an example of a process to generate a data protection environment. As illustrated in FIG. 9, to create a data protection environment according to a generated service plan, the service module 330 may execute 20 the service plan (930). In certain embodiments, to execute the service plan (930), the service module 330 may direct a plurality of services according to the service plan to transform the data protection environment from the current state of the data protection environment to the desired state of the data protection environment. For example, the service module 330 may direct each service of the plurality of services (e.g., storage array service 335-1, virtual storage service 335-2, database service 335-3, host service 335-4 and entity service 335-5) (335, generally) according to respective commands selected from a respective command set 325 to transform the data protection environment from the current state of the data protection environment to the desired state of the data protection environment.

The service module 330 then may transform the data protection environment from the current state of the data protection environment to the desired state of the data protection environment according to the service plan (932).

Not only may example embodiments of the present invention initialize a data protection environment as described above, example embodiments of the present invention also may monitor a data protection environment for deviations from a desired state of the data protection environment and remedy the deviation, as will be set out below.

Figure 10:
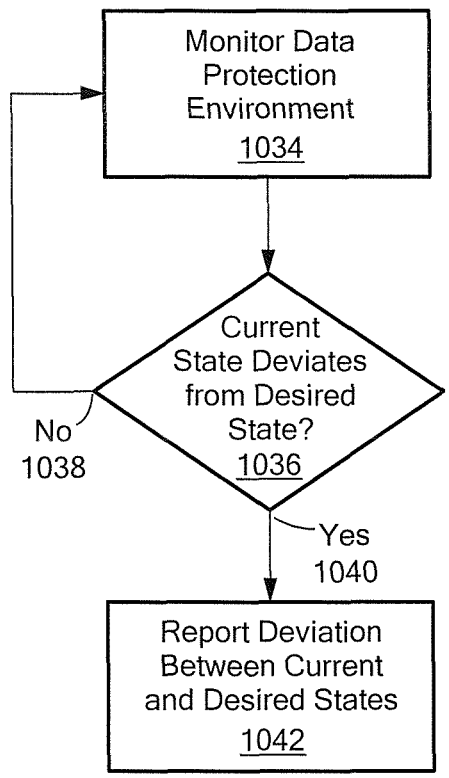
FIG. 10 is a flow diagram of an example of a process to monitor a data protection environment and reporting a deviation between current and desired states of the data protection environment.

FIG. 10 is a flow diagram is an example of a process to monitor a data protection environment and reporting a deviation between current and desired states of the data protection environment. As illustrated in FIG. 10, in addition to receiving input regarding a desired 20 state of a data protection environment for an information technology (IT) infrastructure (402) and creating a data protection environment according to the desired state of the data protection environment (418), the command module 320 in example embodiments of the present invention may monitor the data protection environment (1034) and determine whether a current state of the data protection environment deviates from the desired state of the data protection environment (1036).

With policy specifications defined in the datastore 340, the monitoring and analysis of the data protection environment's compliance to the service plan is possible. If the current state of the data protection environment does not deviate from the desired state of the data protection environment (1038), the command module 320 may continue to monitor the data protection environment (1034). However, if the current state of the data protection environment does deviate from the desired state of the data protection environment (1040), the command module may report the deviation between the current state of the data protection environment and the desired state of the data protection environment to a user (1042). For example, alerts can be sent when certain targets fall out of compliance and reports can be generated to look at historical compliance patterns and issues.

It should be understood that, as will be described below in greater detail with reference to FIG. 12, the initializing and monitoring processes provided by the command module 320 may run in parallel such that changes received by the interface module 310 may cause the desired state of the data protection environment to change such that the command module 320 generates a service plan.

Figure 11:
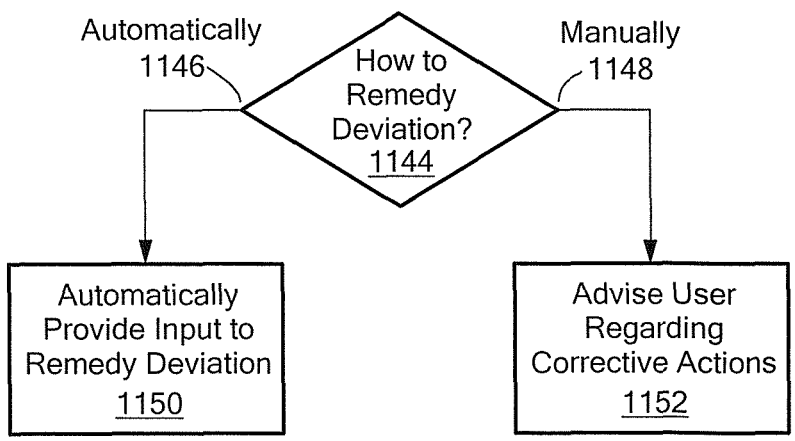
FIG. 11 is a flow diagram of an example of a process to remedy a deviation between current and desired states of the data protection environment.

FIG. 11 is a flow diagram is an example of a process to remedy a deviation between current and desired states of the data protection environment. As illustrated in FIG. 11, the command module 320 may determine how to remedy the deviation (1144) (e.g., automatically or manually). In certain embodiments, if service plans are available in the datastore 340 to remedy the deviation, the command module 320 may implement those service plans automatically. Otherwise, if compliant service plans are not available, the command module 320 may require user intervention via manual remedying of the deviation. Therefore, if the command module 320 elects to remedy the deviation automatically (1146), the command module 320 automatically provides input to remedy the deviation between the current state of the data protection environment and the desired state of the data protection environment (1150). This input may be received (402) as described above with reference to FIG. 4.

Likewise, if the command module 320 elects to remedy the deviation manually (1148), the command module 320 may advise a user regarding corrective actions to remedy the deviation between the current state of the data protection environment and the desired state of the data protection environment (1152). The user then may provide input to remedy the deviation, which may be received (402) as described above with reference to FIG. 4.

Figure 12:
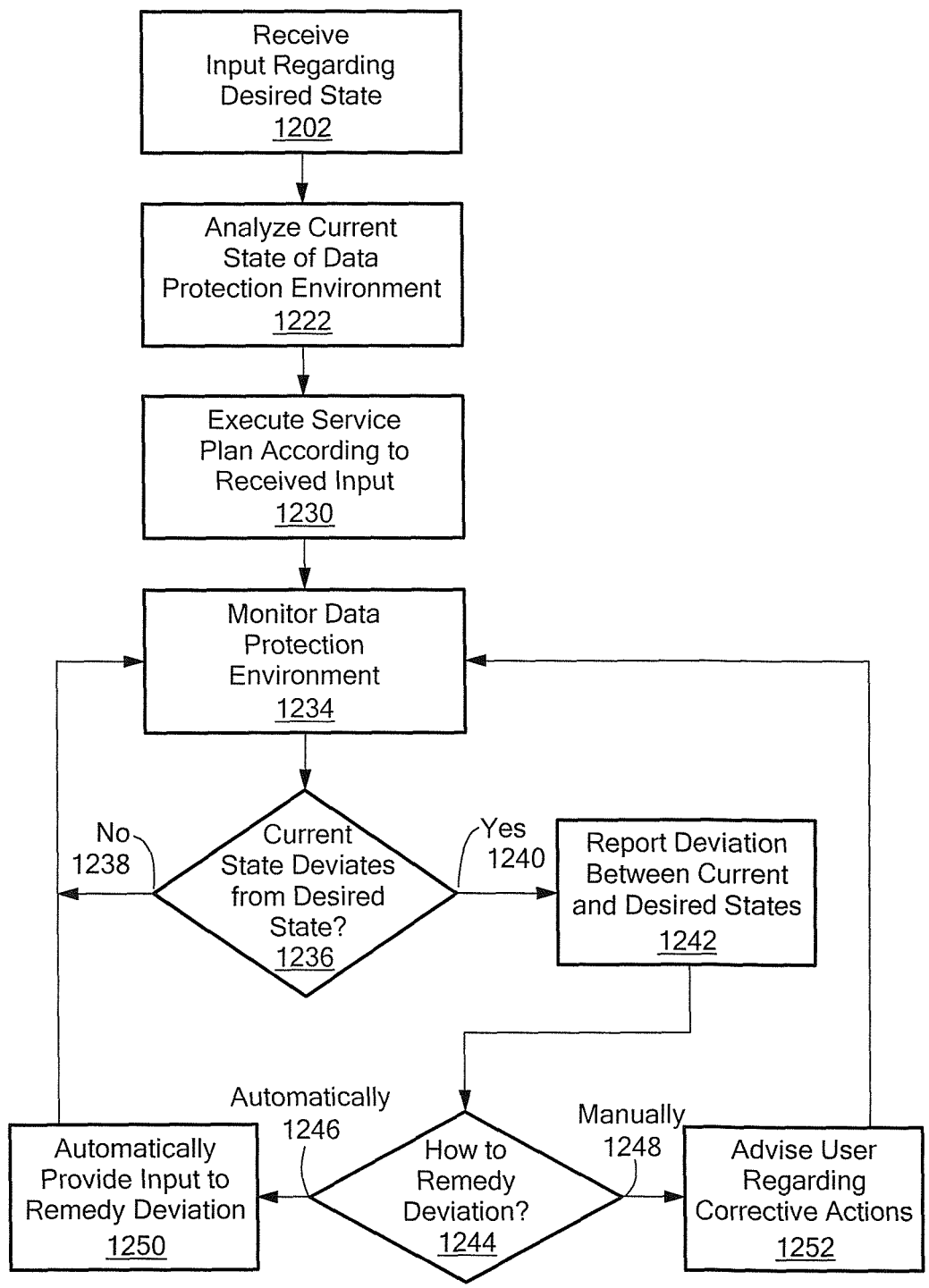
FIG. 12 is a flow diagram of an example of process to initialize and monitor a data protection environment.

FIG. 12 is a flow diagram is an example of a process to initialize and monitoring a data protection environment. The flow diagram of FIG. 12 may be studied in conjunction with FIG. 13, which is a simplified block diagram illustrating a storage array at different times and the initialization, monitoring, and remedying of the data protection environment therein according to an example embodiment of the present invention.

The service plan manager 300 may receive input regarding a desired state of a data protection environment for an IT infrastructure (1202). For example, the received input may specify that a storage array 1350 that includes a first primary volume (i.e., primary 1) 1360 and a second volume (i.e., primary 2) 1370 is to have three replica 5 copies of each volume (i.e., replica 1-1, replica 1-2, replica 1-3 1360-1 to 1360-3 and replica 2-1, replica 2-2, replica 2-3 1370-1 to 1370-3). The command module 320 may analyze a current state of the data protection environment (1222) and determine that there are no replica copies. Therefore, the service module 330 may execute a service plan according to the received input (1230) to provide three replica copies of each volume.

Figure 13:
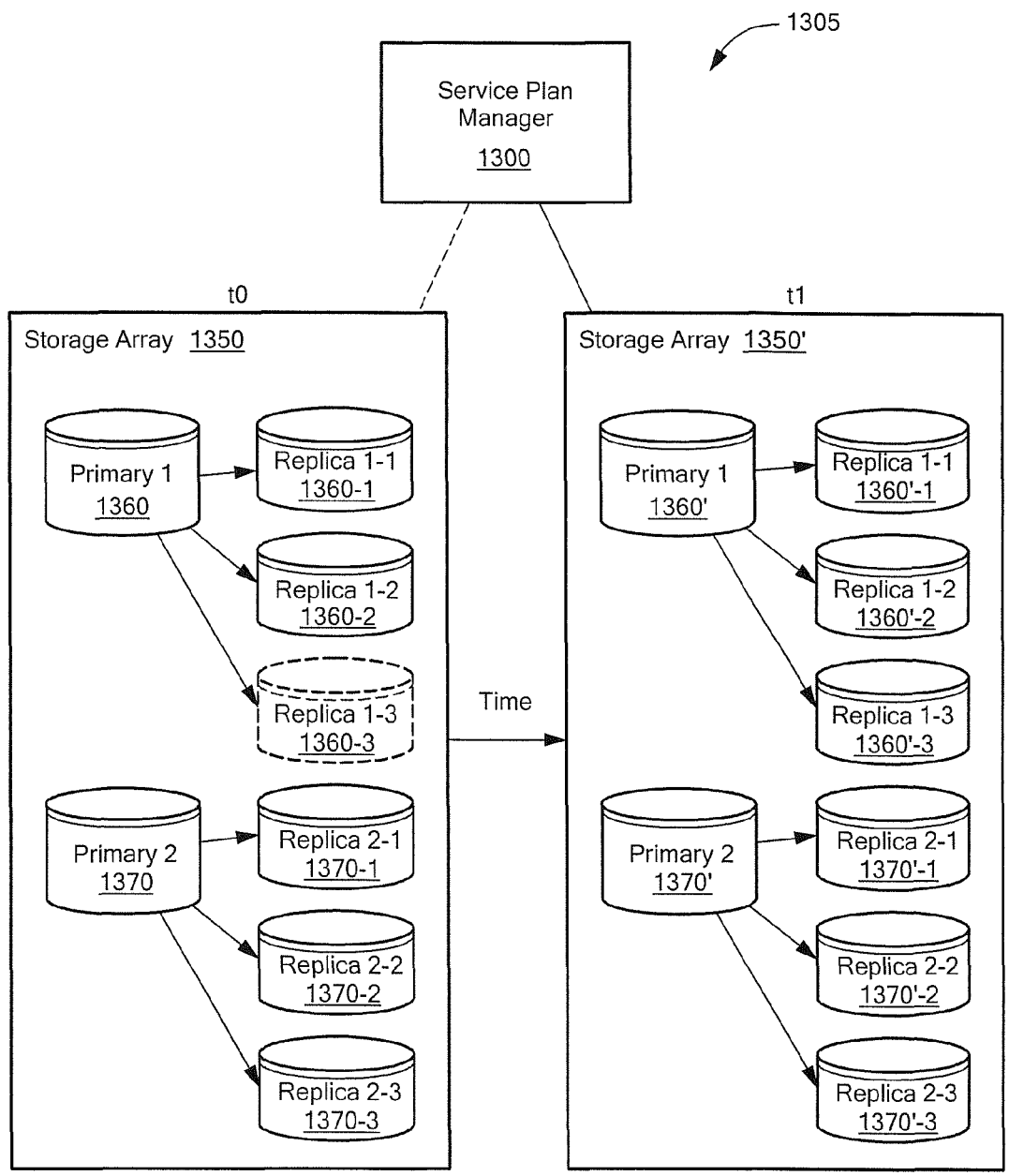
FIG. 13 is a simplified block diagram of an example of a storage array at different times and the initialization, monitoring, and remedying of the data protection environment.

The command manager 310 then may monitor the data protection environment (1234) and determine whether a current state of the data protection environment deviates from the desired state of the data protection environment. As illustrated in FIG. 13 at time t0, replica 1-3 1360-3 has failed or is unavailable. Accordingly, the command module 320 determines that the current state of the data protection environment (i.e., replica 1-3 1360-3 has failed or is unavailable) deviates from the desired state of the data protection environment (i.e., three replicas for both volumes) (1240). The interface module 310 then may report the deviation between the current state of the data protection environment and the desired state of the data protection environment to a user (1242), such as to an administrator.

The command module 320 then may determine how to remedy the deviation (1244). For example, to automatically remedy the deviation (1246), the command module 320 may have a service plan stored in the datastore 340 which the command module 320 may provide as input to remedy the deviation by automatically provisioning replicas to replace the failed third replica for volume 1 (1246). Alternatively, the command module 320 may determine that manual remediation (1248) is necessary and may advise a user regarding corrective actions to remedy the deviation between the current state of the data protection environment and the desired state of the data protection environment (e.g., the user needs to provision a third replica of the first volume) (1252). Therefore, as illustrated in FIG. 13 at time t1, the data protection environment of the storage array 1350' again includes three replica copies of each volume (i.e., replica 1-1, replica 1-2, replica 1-3 1360'-1 to 1360'-3 and replica 2-1, 10 replica 2-2, replica 2-3 1370'-1 to 1370'-3). Regardless of which remedy is performed (i.e., automatic or manual), the command module 320 continues to monitor the data protection environment (1234). Accordingly, the command module 320 determines that the current state of the data protection environment (i.e., replica 1-3 1360'-3 is in place) does not deviate from the desired state of the data protection environment (i.e., three replicas for both volumes) (1238). The command module 320 then may continue to monitor the data protection environment (1234). It should be understood that the initializing and monitoring processes provided by the command module 320 may run in parallel such that changes received by the interface module 310 may cause the desired state of the data protection 20 environment to change such that the command module 320 generates a service plan.

Figure 14:
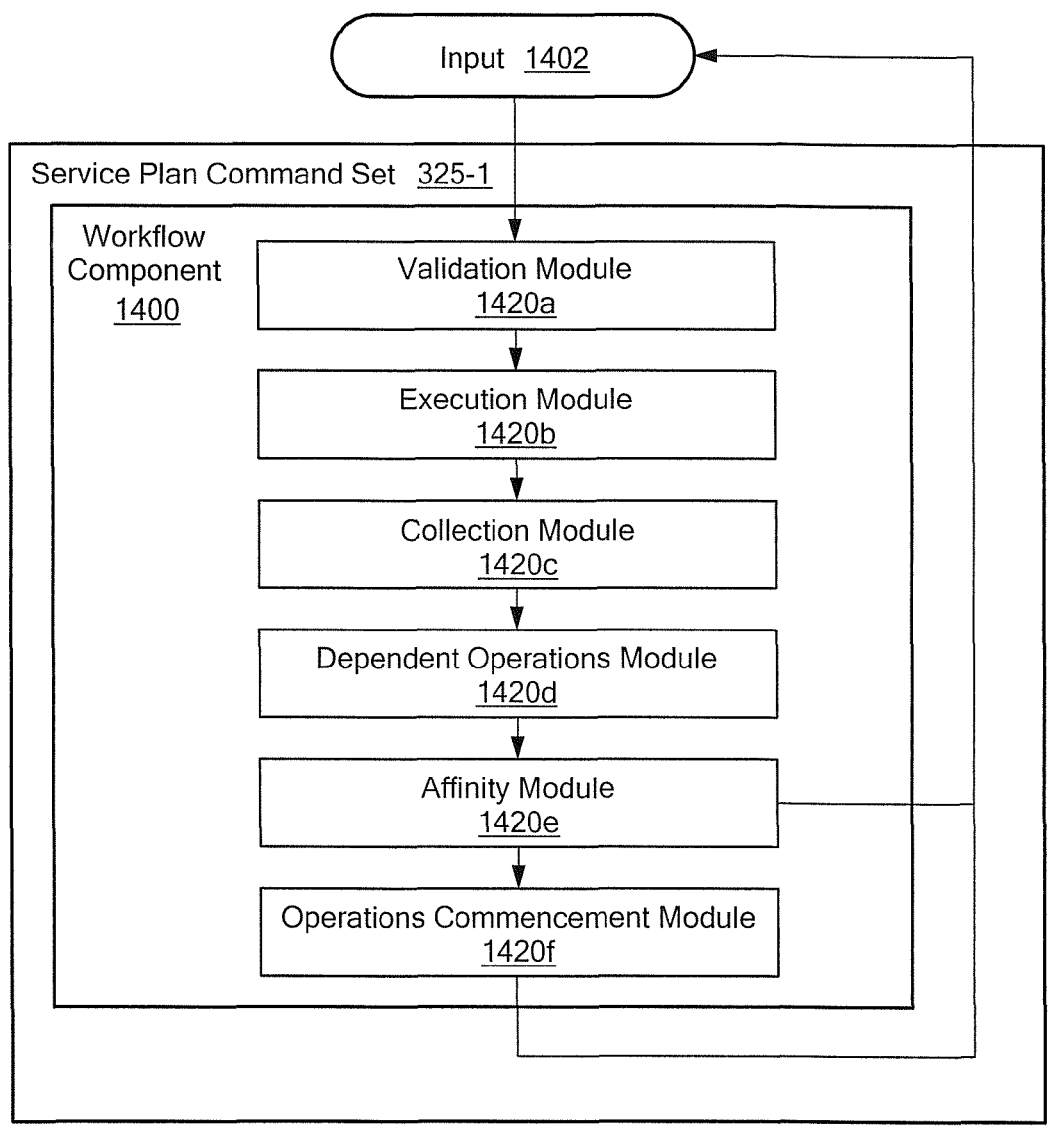
FIG. 14 is a simplified block diagram of an example of a service plan command set that includes a workflow component.

Referring to FIG. 14, in one example, a service plan command set 325-1 may include a workflow component 1400. The workflow component 1400 receives an input 1402 and includes a validation module 1420a, an execution module 1420b, a collection module 1420c, a dependent operations module 1420d, an affinity module 1420e and an operations commencement module 1420f. The input 1402 includes information from the service plan, application component grouping and the current operation. In one particular example, the affinity module 1420e provides the application component grouping and current operation as further described herein. For example, the affinity module 1420e portions a single operation and a collection of application components already grouped according to a set of affinity rules to ensure maximum chance of success. In one particular example, the workflow component 1400 is used to configure a data protection system as described in FIG. 13 by translating a user's service requirements into a data protection configuration.

As used herein an operation is defined as an atomic task that satisfies a portion of the user's overall data protection objectives. A user's data protection objectives are typically not restricted to a simple act of replication. Most data protection strategies require several steps to occur in sequence to ensure data protection. For example, operations may include, but are not limited to, generating a replica of a user's database, mounting a replica of a file system, dismounting a previously mounted replica from a server, running a user-generated script on a server, or restoring a replica back to a production database.

As used herein an application component is defined as a data structure that is manipulated by a server or database that contains the data to be protected. Examples of application components include databases, entire file systems or physical hard drives containing user data.

Figure 15:
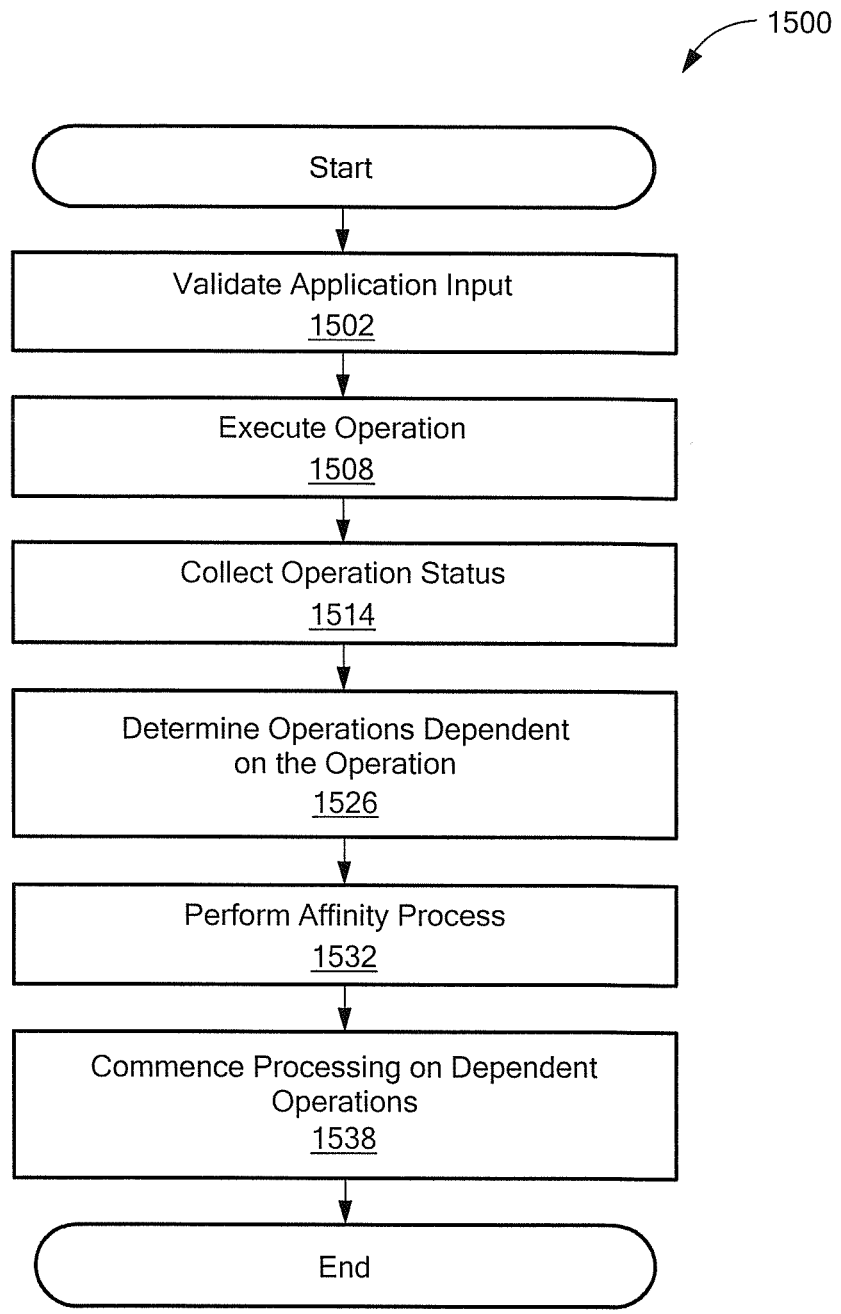
FIG. 15 is a flow diagram of an example of a process performed by the workflow component.

Referring to FIGS. 14 and 15, the workflow component 1400 performs in one example a process 1500. The validation module 1420a validates (1502) the input 1402 including the application components. Also, the validation module 1420a validates an overall structure of all of the operations in a service plan. A service plan includes the specification of a flow of the operations to ensure protection and reuse of user data. For example, the validation module 1420a validates that all of the operations in the service plan are in a supported order, and that no operations are redundant or missing overall. This is the only time the workflow component 1400 "looks ahead" at all operations; otherwise, the workflow component 1400 modules 1420b-1420f will process one operation at a time.

The execution module 1420c then executes (1508) an operation by running the respective operation.

When the execution of the operation is complete, the collection module 1420c collects (1514) the information about the status of the operation. For example, an operation may fail due to inability to reach a server or storage system. Collection of this status information is critical to determine if the next operation in the operation flow can be executed or not. If an operation that creates a replica of production data fails, the collection module 1420c determines what this failure impacts, and may even invalidate future operations processing, such as mounting that replica. In one particular example, workflow component 1400 performs a particular default function for certain statuses. For example, the default behavior of the collection module 1420c may be to prematurely end the operation flow upon failure of any one operation. In other examples, some operational flows may require rules within the service plan to dynamically determine how to proceed. A user is allowed to inject a user script operation into the operation flow and specify in the service plan settings whether a failing status of that script prevents the continuation of the operation flow, or whether the failing status can be ignored by the collection module.

After collecting status and determining if it is acceptable to continue, the dependent operations module 1420d determines (1526) the dependent operations of the operation being processed by reading from the service plan. There may be many dependent operations. A service plan can define an operation that replicates production data by creating replicas on both a local and remote site. The operation flow can specify two separate operations dependent on the completed replication operation; an operation to mount the resulting local replica to a local server; and an operation to mount the resulting remote replica to a remote server. Both mount operations happen concurrently and separately.

The affinity module 1420e performs (1532) an affinity process on each type of operation to ensure operations are carried out at the right level of the application, storage system, and support software granularity. For example, if a single replication is to be performed with three datastores mounted to three separate devices, then three concurrent mount operations based on affinity rules would be performed. Affinity rules are a set of no-tie ranked business rules that determine, given a set of inputs (applications, storage systems, software support), the proper grouping of application components that would give the best chance of success for an operation. An example of a software based affinity rule is "Volume Shadow Service (VSS) in MICROSOFT® WINDOWS® does not allow more than eight devices in a replica set, therefore if the customer specifies applications that reside on more than eight devices, place the applications in separate groups whose individual operation will not exceed eight underlying devices." An example of an application based affinity rule is "It is not possible to get application consistency of file systems on more than one host without special storage consideration. If the service plan contains file systems from different hosts, create an affinity group for each host and place each host's respective file systems in each group."

The operations commencement module 1420*f* commences (1538) the next level of operations by processing the dependent operations through the workflow component 1400 by repeating the process 1500.

Figure 16:
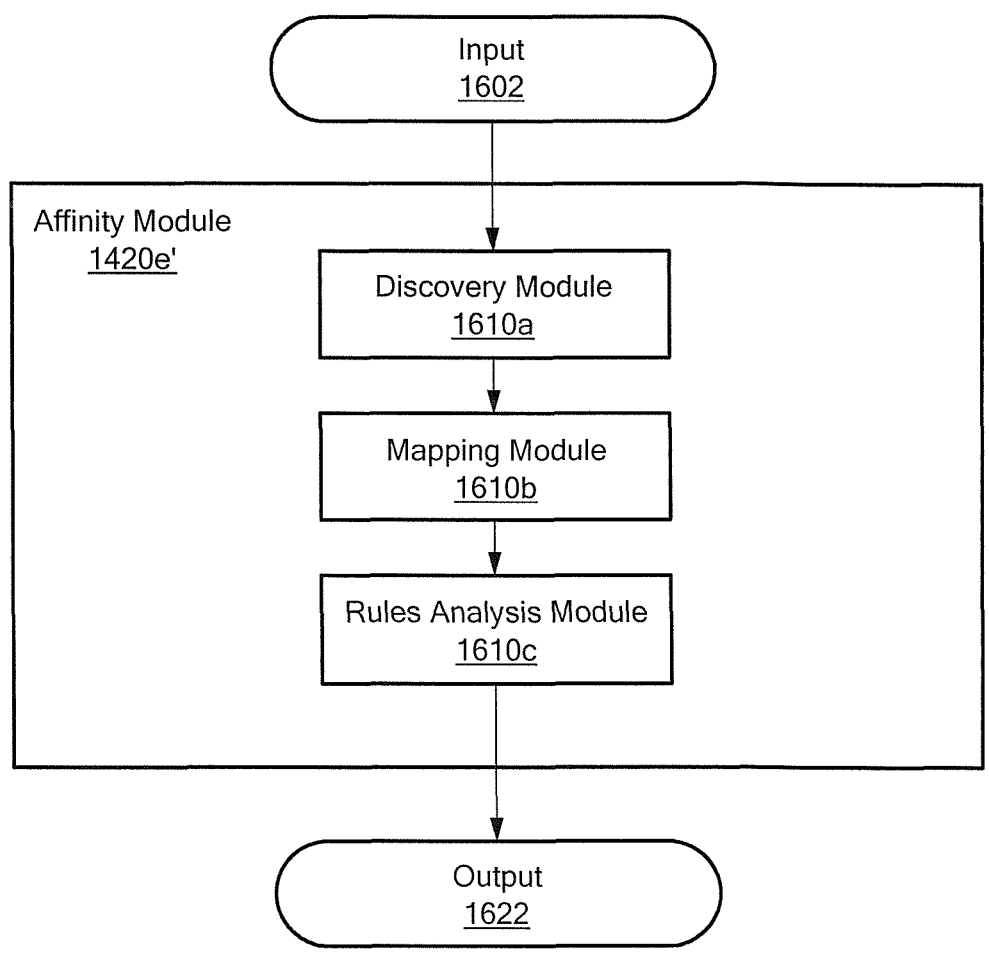
FIG. 16 is a simplified block diagram of an affinity module.

Referring to FIG. 16, one example of an affinity module 1420*e* is an affinity module 1420*e*'. The affinity module 1420*e*' receives an input 1602 and includes a discovery module 1610*a*, a mapping module 1610*b* and a rule analysis module 1610*c*. The input 1602 includes information from the service plan such as operations to perform, service level objectives (SLOs) to follow, application components that need to be acted upon and the operation currently scheduled for execution. The input 1602 may also include dislike applications, such as Linux file systems and database files from a MICROSOFT® WINDOWS® server. These dislike applications cannot be replicated together for several technical reasons outside the control of our managing application, however they can be applied to the same service plan. The affinity module is responsible for detecting differences in the application type and creating application groupings that have the best chance of executing a successful operation.

Figure 17:
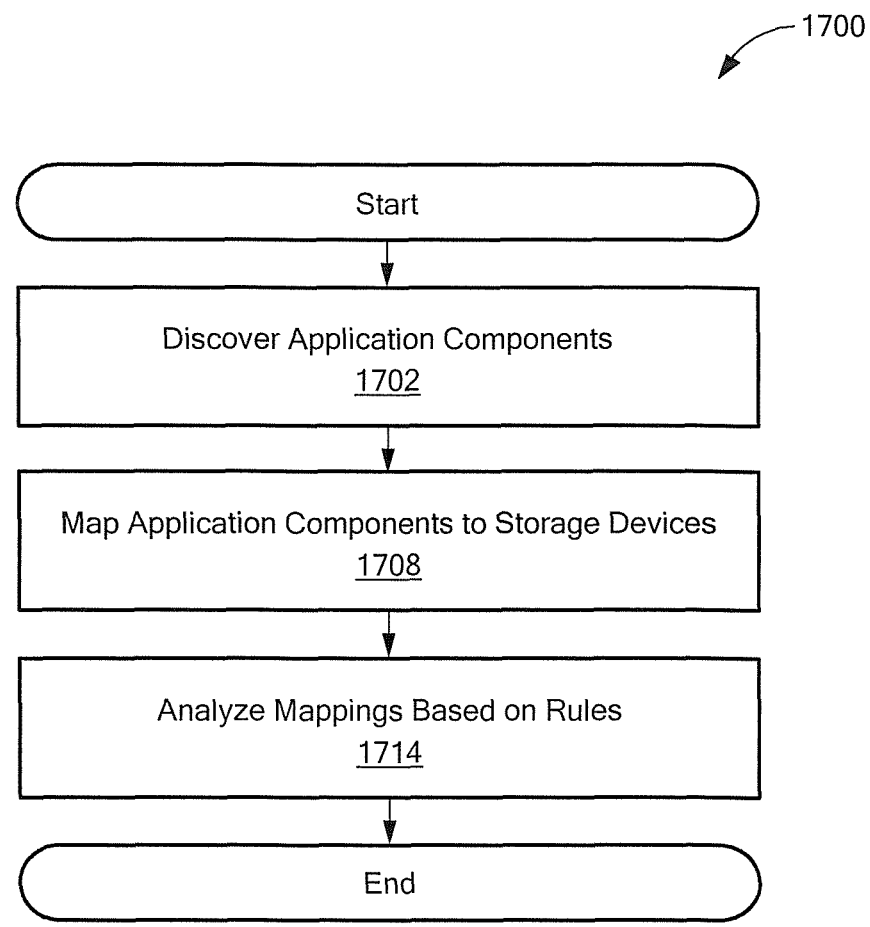
FIG. 17 is a flow diagram of an example of a process performed by the affinity module.

Referring to FIGS. 16 and 17, one example of a process performed by the affinity module 1420*e*' is a process 1700. The discovery module 1610*a* discovers (1702) application components scheduled for execution to account for the application components such as databases, filegroups, filesystems, files, physical devices, datastores, VMs, and so on.

The mapping module 1610*b* then maps (1708) the application components to determine the production storage characteristics, and depending on the operation required, any replication storage characteristics as well. This mapping information is important in grouping applications properly to ensure successful execution of the operation.

The rules analysis module 1610*c* then analyzes (1714) this mapping information through a set of prioritized rules that group and/or split the list of application components in a way that provides the best chance of operation success.

An output 1622 of the affinity module 1420*e*' includes a list of application component groupings that make the most sense for the workflow component to operate on, independently and concurrently, and passes this information off to the operations commencement module 1420*f* and then through workflow component 1400 for operation processing. Process 1500 is repeated when the operation succeeds and any subsequent operations are scheduled to run.

It should be noted that not every type of operation requires discovery and mapping (e.g., processing blocks 1702 and 1708). For example, some operations may require information about the results of previously executed operations to provide input into the rules analysis module 1610*c*.

Figure 18:
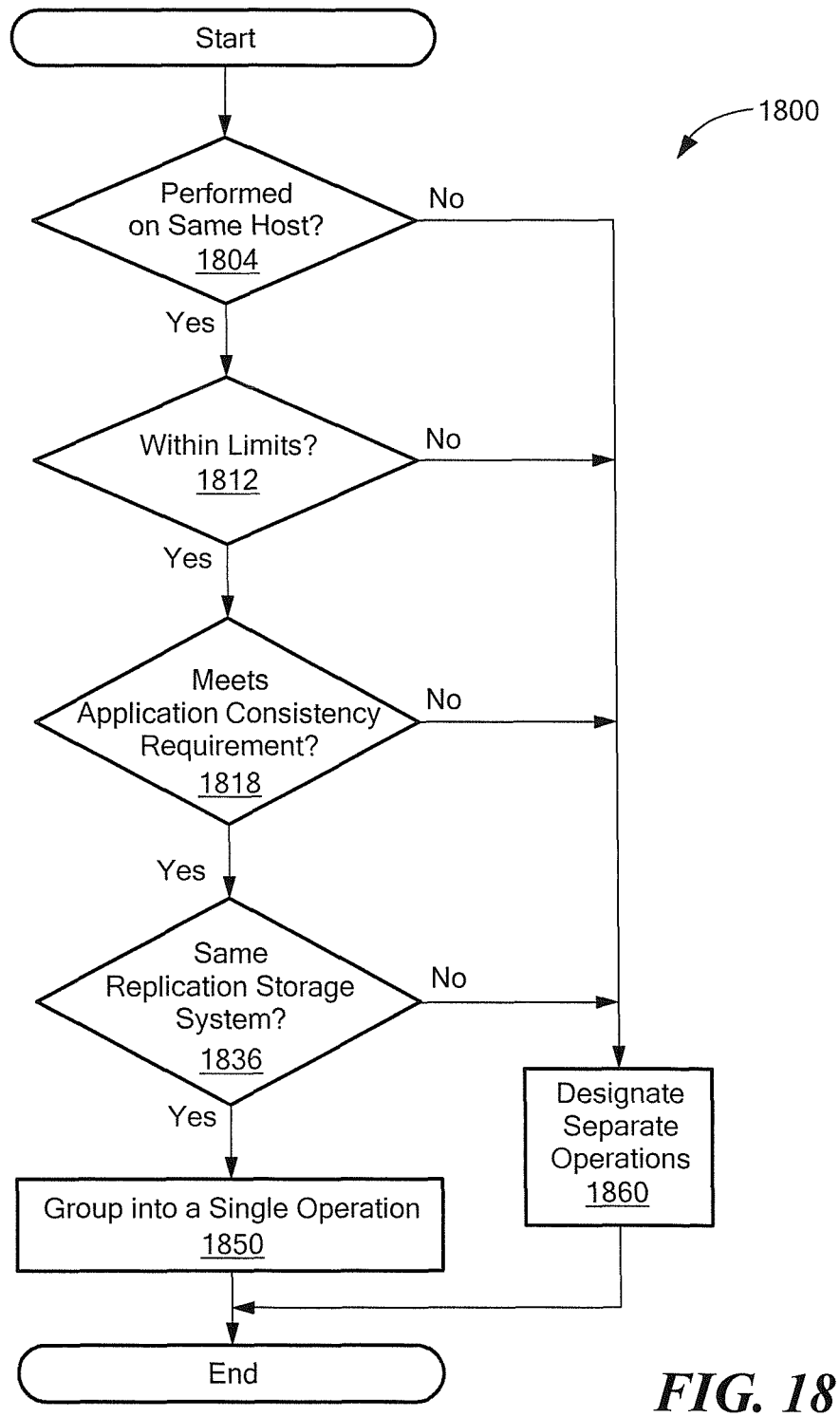
FIG. 18 is a flow diagram of an example of a subprocess performed by the workflow component.

Referring to FIG. 18, one example of a process to group application components using the rules analysis module 1610*c* is a process 1800. Process 1800 determines if the application components are performed on the same host (1804), perform within specified limits (1812), meet application consistency requirements (1818) and are on the same replication storage system (1836). If the application components perform on the same host, perform within the specified limits (e.g., Volume Shadow Service (VSS) in MICROSOFT® WINDOWS® prevents replicating more than eight devices at a time), meet application consistency requirements (e.g., a database requires all file systems that belong to a database to be replicated together in one operation), and are on the same replication storage system, then the application components may be grouped (1850) together in a single operation. If any one of the conditions is false, then the application components are separated (1860) into different operations.

Figure 19A:
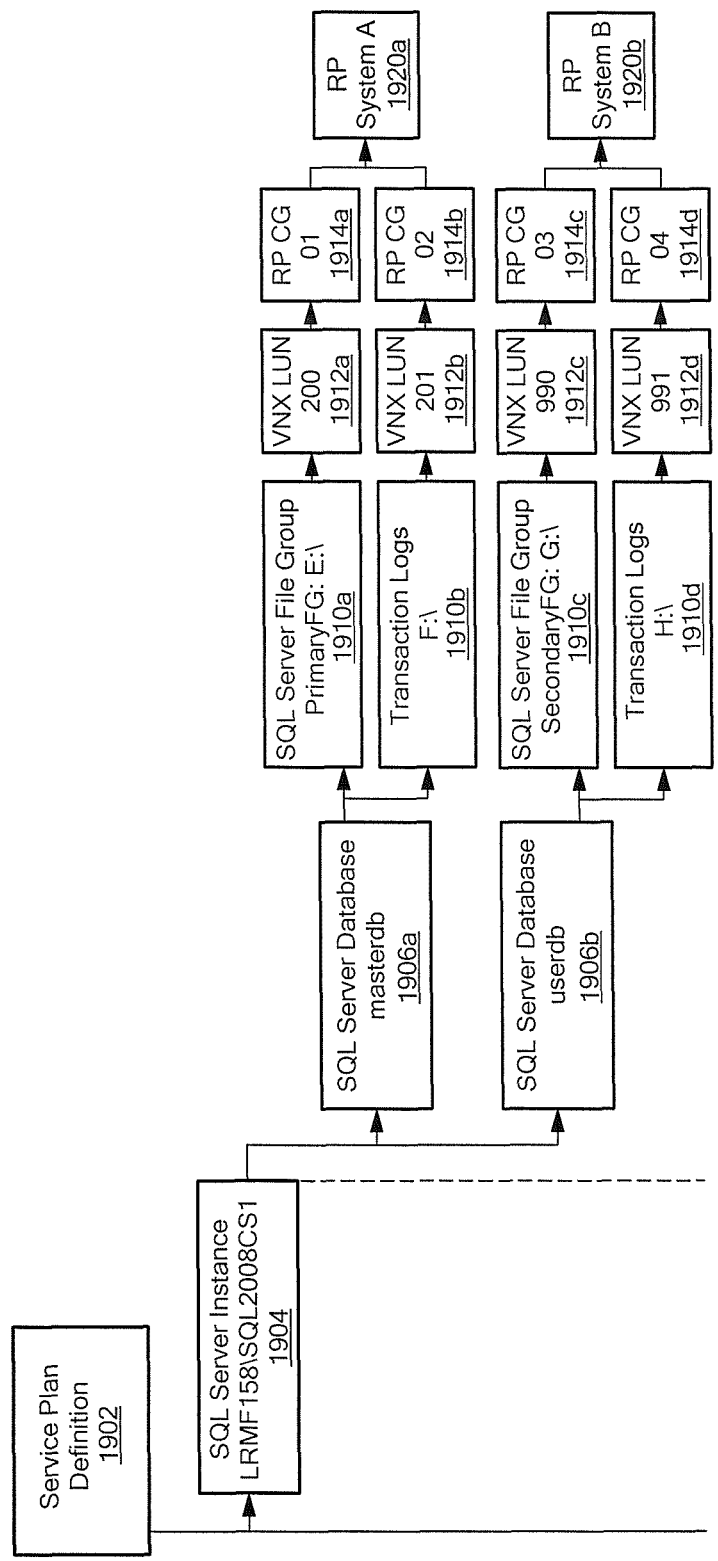
FIGS. 19A to 19D are diagrams illustrating examples of processes performed by the affinity module.

FIG. 19A depicts an example of using the affinity module 1420*e*. A service plan definition 1902 can designate more than one application component, file system and so forth. FIG. 19A depicts the service plan 1902 just defining a single operation, an instance of an SQL server 1904 which is tied to two application components, SQL server databases 1906*a*, 1906*b*, defined in the service plan. The affinity module 1420*e* maps the SQL server database 1906*a* to a primary file group 1910*a* and a transaction log 1910*b* and maps the SQL server database 1906*b* to a secondary file group 1910*c* and a transaction log 1910*e*.

The primary file group 1910*a* is mapped to a LUN 1912*a*, which is mapped to a replication protection (RP) consistency group (CG) 1914*a*. The transaction log 1910*b* is mapped to a LUN 1912*b*, which is mapped to a RP CG 1914*b*.

The secondary file group 1910*c* is mapped to a LUN 1912*c*, which is mapped to a RP CG 1914*c*. The transaction log 1910*d* is mapped to a LUN 1912*d*, which is mapped to a RP CG 1914*d*. The RP CGs 1914*a*, 1914*b* are mapped to the replication protection system 1920*a* and the RP CGs 1914*c*, 1914*d* are mapped to the replication protection system 1920*b*.

Figure 19B:
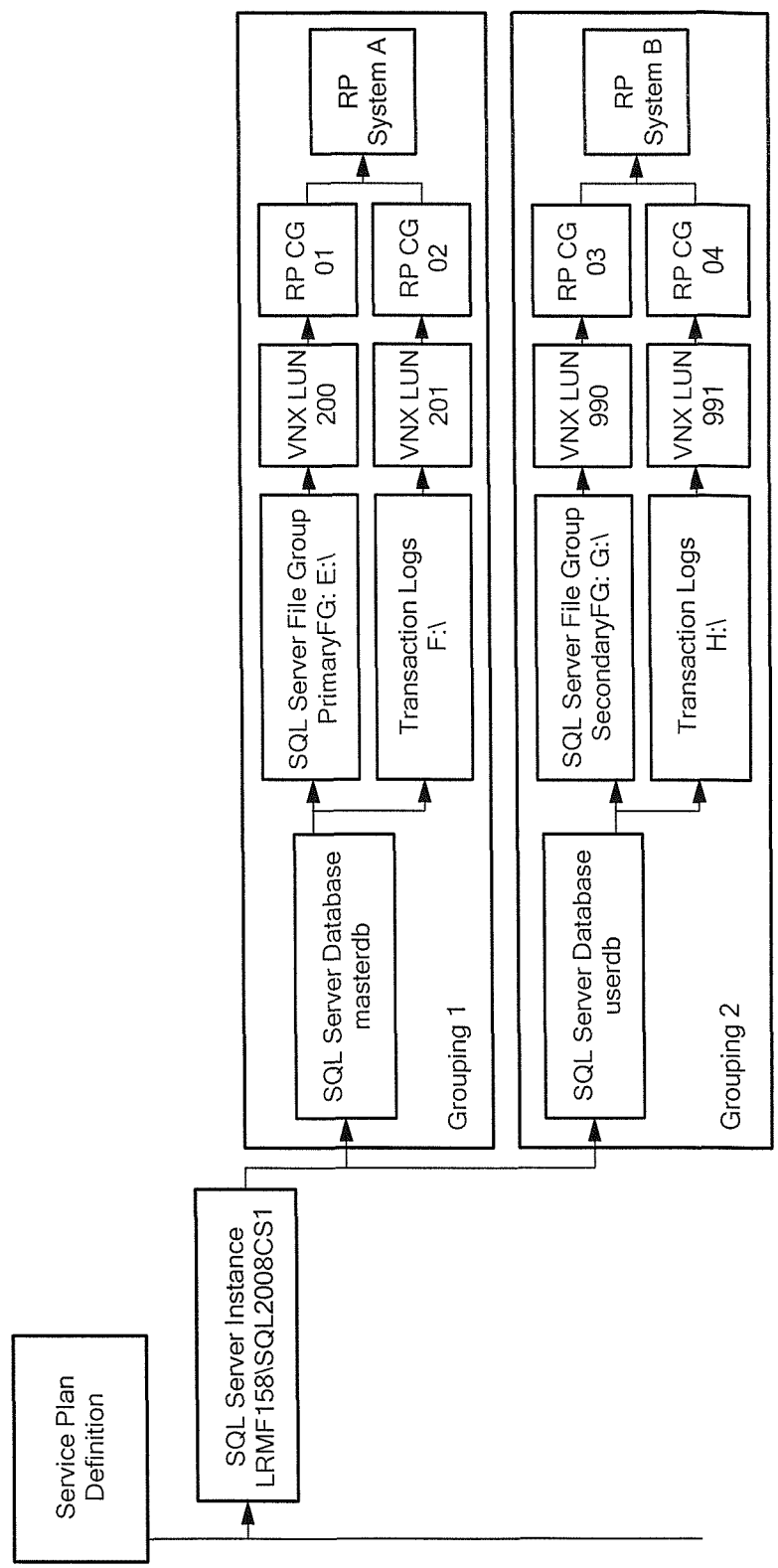

Referring to FIG. 19B, applying the process 1800 to the diagram in FIG. 19A, the server database 1906*a* and the server database 1906*b* are each mapped to separate replication protection systems 1920*a*, 1920*b* and therefore they would be grouped separately, into Grouping 1 and Grouping 2.

Figure 19C:
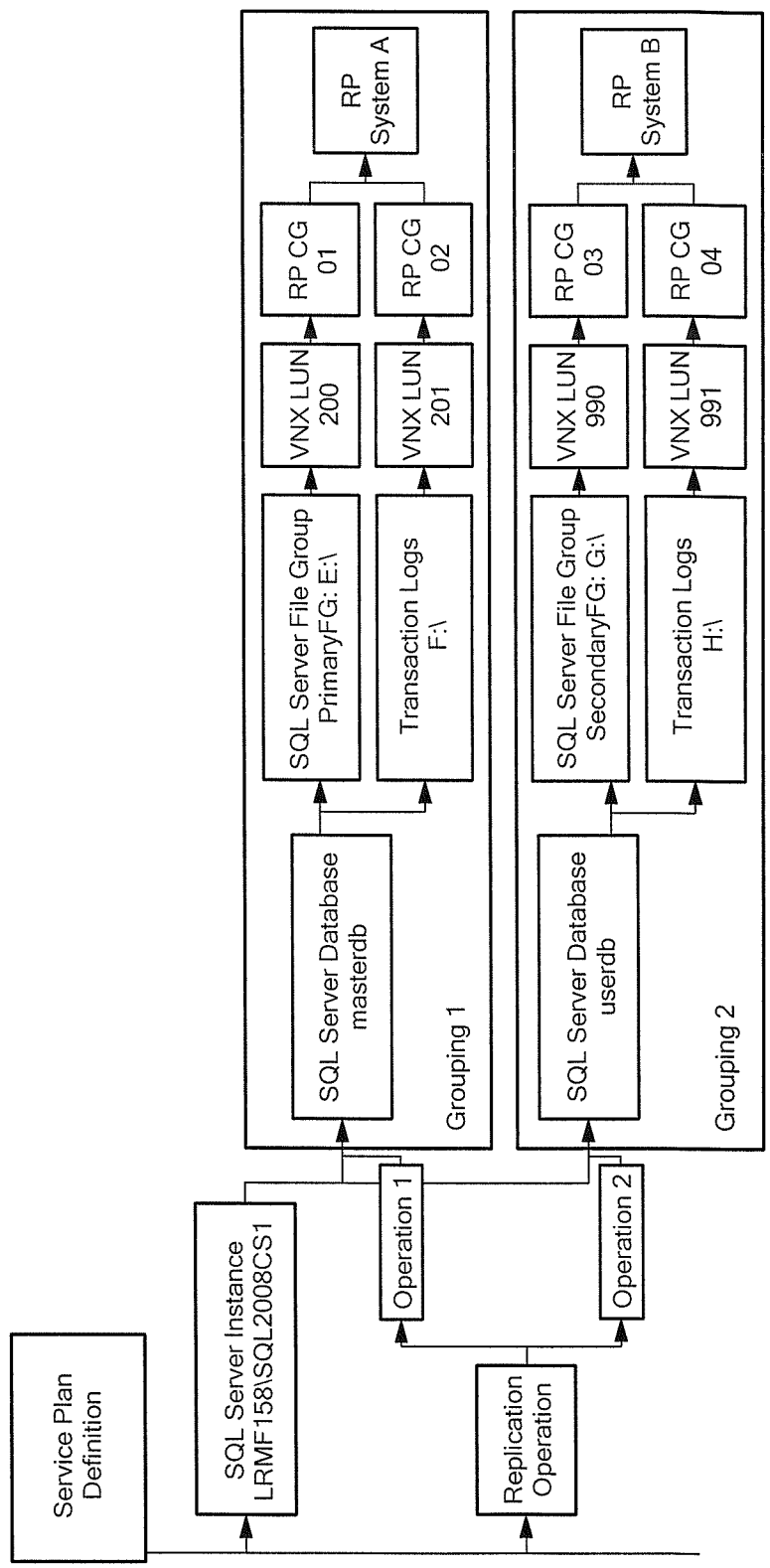

Referring to FIG. 19C, the Grouping 1 would be tied to a replication operation, operation 1 and the Grouping 2 would be tied to a replication operation, operation 2 separate and distinct from operation 1.

Figure 19D:
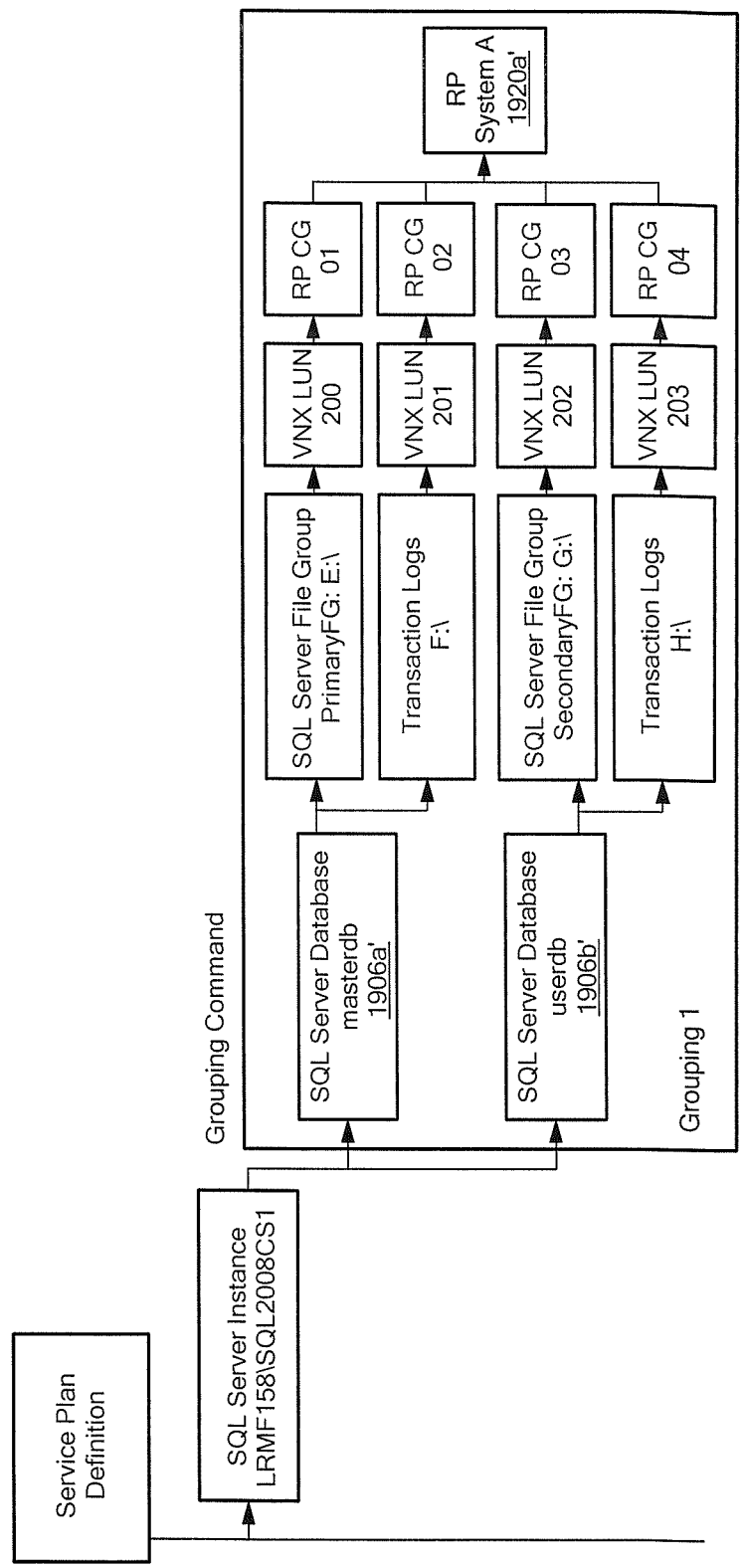

Referring to FIG. 19D, applying the process 1800 to a different mapping where a server database 1906*a*' and a server database 1906*b*' are each eventually mapped to a RP system 1920*a*', then both server databases 1906*a*' and 1906*b*' and their mapped devices would be grouped together to perform the same operation.

Figure 20:
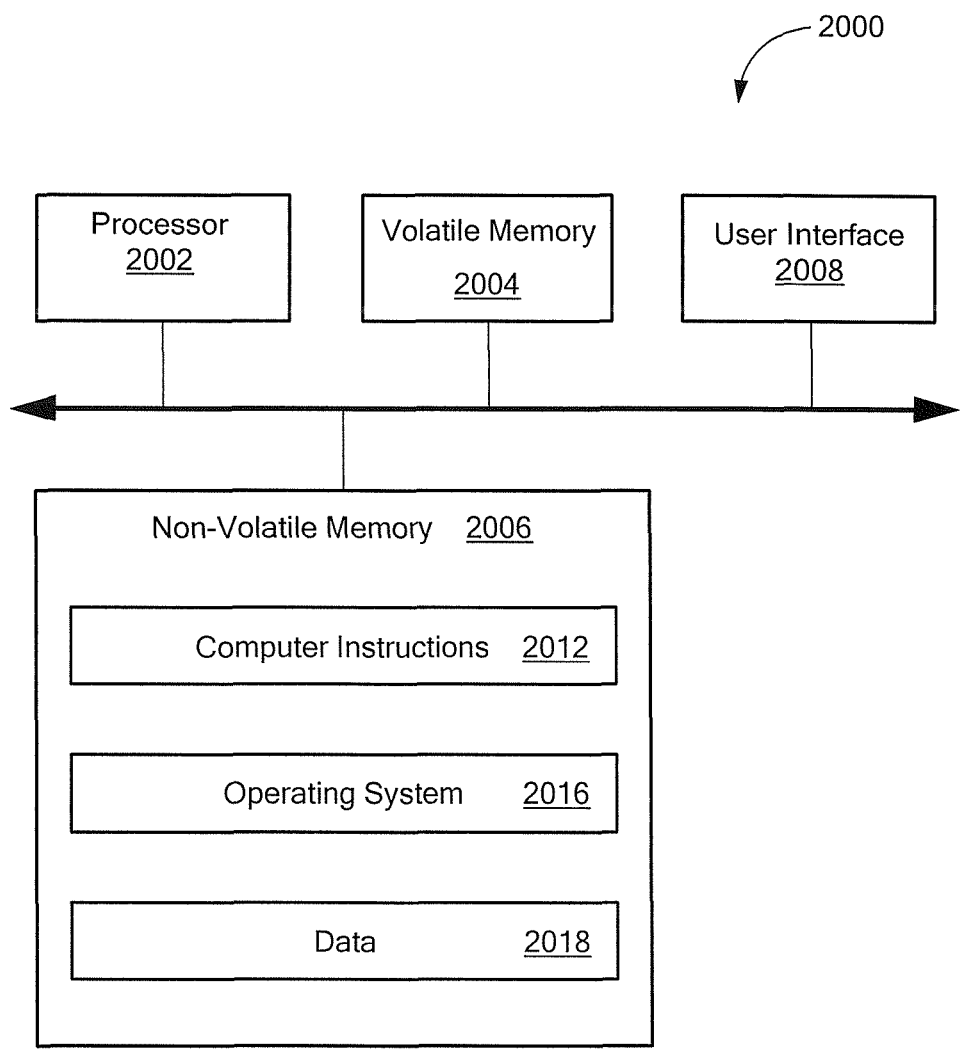
FIG. 20 is a computer on which any of the processes of FIGS. 15, 17 and 18 may be implemented.

Referring to FIG. 20, an example of a computer to perform the processes herein is a computer 2000. The computer 2000 includes a processor 2002, a volatile memory 2004, a non-volatile memory 2006 (e.g., hard disk) and a user interface (UI) 2008 (e.g., a mouse, a keyboard, a display, touch screen and so forth). The non-volatile memory 2006 stores computer instructions 2012, an operating system 2016 and data 2018. In one example, the computer instructions 2012 are executed by the processor 2002 out of volatile memory 2004 to perform all or part of the processes described herein (e.g., processes 1500 and 1700).

The processes described herein (e.g., processes 1500, 1700 and 1800) are not limited to use with the hardware and software of FIG. 20; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform the processes described herein. The processes described herein may also be implemented as a machine-readable storage medium, configured with a computer program, where upon execution, instructions in the computer program cause the computer to operate in accordance with the processes.

The processes described herein are not limited to the specific examples described. For example, the processes (e.g., processes 1500, 1700 and 1800) are not limited to the specific processing order of FIGS. 15, 17 and 18, respectively. Rather, any of the processing blocks of FIGS. 15, 17 and 18 may be re-ordered, combined or removed, performed in parallel or in serial, as necessary, to achieve the results set forth above.

The processing blocks (for example, in processes 1500, 1700 and 1800) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)).

Elements of different embodiments described herein may be combined to form other embodiments not specifically set forth above. Other embodiments not specifically described herein are also within the scope of the following claims.

What is claimed is:

1. A method, comprising:
   validating application components, a set of operations and a flow of the operations, wherein the application component is a data structure that is manipulated by a server or a database and comprises data to be protected, wherein the application components, the operations and the flow of the operations being determined from a service plan, the flow of the operations enabling protection and reuse of the application components;
   executing an operation of the set of operations;
   collecting status of the executing of the operation;
   determining dependent operations that are dependent on the operation;
   performing an affinity process based on a set of rules to determine which of the application components to group under a single dependent operation and which of the application components to separate into different dependent operations; and
   repeating the validating, executing, collecting, and determining for each dependent operation.

2. The method of claim 1 wherein validating the application components, the set of operations and the flow of the operations comprises validating the set of operations comprising at least one of:
   generating a replica of a database;
   mounting a replica of a file system;
   dismounting a previously mounted replica from a server;
   running a user-generated script on a server; or
   restoring a replica back to a production database.

3. The method of claim 1, wherein validating the flow of operations comprises validating that the operations are in a supported order, and that no operations are redundant or missing.

4. The method of claim 1, wherein validating application components comprises validating application components comprising at least one of a data structure or a database.

5. The method of claim 1, further comprising determining from the service plan a next action to perform if the status indicates that the execution of the operation failed.

6. The method of claim 1, wherein executing the operation comprises executing an operation comprising an atomic task that satisfies a portion of a user's data protection objectives.

7. The method of claim 1 wherein validating application components comprises validating application components comprising at least one of a databases, an entire file system or a physical hard drives containing user data.

8. An article comprising: a non-transitory machine-readable medium that stores executable instructions, the instructions causing a machine to:
   validate application components, a set of operations and a flow of the operations, the application components, wherein an application component being a data structure that is manipulated by a server or a database and comprises data to be protected, wherein the operations and the flow of the operations being determined from a service plan, the flow of the operations enabling protection and reuse of the application components;
   execute an operation of the set of operations;
   collect status of the executing of the operation;
   determine dependent operations that are dependent on the operation;
   perform an affinity process based on a set of rules to determine which of the application components to group under a single dependent operation and which of the application components to separate into different dependent operations; and
   repeat the validating, executing, collecting, and determining for each dependent operation.

9. The article of claim 8 wherein the instructions causing the machine to validate the application components, the set of operations and the flow of the operations comprises instructions causing the machine to validate a set of operations comprising at least one of:
   generating a replica of a database;
   mounting a replica of a file system;
   dismounting a previously mounted replica from a server;
   running a user-generated script on a server; or
   restoring a replica back to a production database.

10. The article of claim 8, wherein the instructions causing the machine to validate the flow of operations comprises instructions causing the machine to validate that the operations are in a supported order, and that no operations are redundant or missing.

11. The article of claim 8, wherein the application components comprise at least one of a data structure or a database.

12. The article of claim 8, further comprising instructions causing the machine to determine from the service plan a next action to perform if the status indicates that the execution of the operation failed.

13. The article of claim 8, wherein the operation comprises an atomic task that satisfies a portion of a user's data protection objectives.

14. An apparatus, comprising:
   circuitry configured to:
      validate application components, a set of operations and a flow of the operations, wherein an application component is a data structure that is manipulated by a server or a database and comprises data to be protected, wherein the application components, the operations and the flow of the operations being determined from a service plan, the flow of the operations enabling protection and reuse of the application components;
      execute an operation of the set of operations;
      collect status of the executing of the operation;
      determine dependent operations that are dependent on the operation;
      perform an affinity process based on a set of rules to determine which of the application components to group under a single dependent operation and which of the application components to separate into different dependent operations; and
      repeat the validating, executing, collecting, and determining for each dependent operation.

15. The apparatus of claim 14 wherein the circuitry comprises at least one of a processor, a memory, programmable logic and logic gates.

16. The apparatus of claim 14, wherein the circuitry configured to validate the application components, the set of operations and the flow of the operations comprises circuitry configured to validate the set of operations comprising at least one of:
   generating a replica of a database;
   mounting a replica of a file system;
   dismounting a previously mounted replica from a server;
   running a user-generated script on a server; or
   restoring a replica back to a production database.

17. The apparatus of claim 14, wherein the circuitry configured to validate the flow of operations comprises circuitry configured to validate that the operations are in a supported order, and that no operations are redundant or missing.

18. The apparatus of claim 14, wherein the application components comprise at least one of a data structure or a database.

19. The apparatus of claim 14, further comprising circuitry configured to determine from the service plan a next action to perform if the status indicates that the execution of the operation failed.

20. The apparatus of claim 14, wherein the operation comprises an atomic task that satisfies a portion of a user's data protection objectives.

\* \* \* \* \*